US011377057B2

(12) United States Patent
Dewey et al.

(10) Patent No.: US 11,377,057 B2
(45) Date of Patent: Jul. 5, 2022

(54) SEAT LOCATION IDENTIFICATION SYSTEM FOR VEHICLES WITH REMOVABLE SEATS

(71) Applicant: AUTOLIV ASP, INC., Ogden, UT (US)

(72) Inventors: Kevin J. Dewey, Shelby Township, MI (US); Michael A. Warznie, Lake Orion, MI (US)

(73) Assignee: Autoliv ASP, Inc., Ogden, UT (US)

( * ) Notice: Subject to any disclaimer, the term of this patent is extended or adjusted under 35 U.S.C. 154(b) by 317 days.

(21) Appl. No.: 16/653,174

(22) Filed: Oct. 15, 2019

(65) Prior Publication Data
US 2021/0107422 A1     Apr. 15, 2021

(51) Int. Cl.
| B60R 21/015 | (2006.01) |
| B60Q 9/00 | (2006.01) |
| B60R 21/01 | (2006.01) |
| B60N 2/01 | (2006.01) |
| B60N 2/14 | (2006.01) |

(52) U.S. Cl.
CPC .......... B60R 21/01554 (2014.10); B60Q 9/00 (2013.01); B60R 21/01512 (2014.10); B60N 2/01 (2013.01); B60N 2/14 (2013.01); B60R 2021/01286 (2013.01)

(58) Field of Classification Search
CPC ........ B60R 21/01554; B60R 21/01512; B60R 2021/01286; B60Q 9/00; B60N 2/01; B60N 2/14; B60W 60/00; G05D 1/0088
See application file for complete search history.

(56) References Cited

U.S. PATENT DOCUMENTS

| 9,266,487 | B2 * | 2/2016 | Engelman | G06V 20/593 |
| 9,815,388 | B1 * | 11/2017 | Lindsay | B60N 2/0276 |
| 9,950,682 | B1 * | 4/2018 | Gramenos | B60R 21/01546 |
| 10,040,373 | B2 * | 8/2018 | Rawlinson | B60N 2/06 |
| 10,625,699 | B2 * | 4/2020 | Gramenos | B60N 2/14 |
| 10,730,407 | B2 * | 8/2020 | Guy | B60N 2/0715 |
| 2003/0209893 | A1 * | 11/2003 | Breed | B60N 2/0248 280/735 |
| 2005/0150705 | A1 * | 7/2005 | Vincent | B60N 2/06 180/271 |
| 2005/0151355 | A1 * | 7/2005 | Hanlon | B60N 2/06 280/735 |
| 2009/0230663 | A1 * | 9/2009 | Mills | B60R 21/2338 280/735 |

(Continued)

Primary Examiner — Angelina Shudy
(74) Attorney, Agent, or Firm — Harness, Dickey & Pierce, P.L.C.; Stephen T. Olson

(57) ABSTRACT

A method includes sensing when a seat is at a first location in a vehicle, and controlling an occupant restraint system of the vehicle in a first manner based on the seat being at the first location in the vehicle. The method further includes sensing when the seat is at a second location in the vehicle, and controlling the occupant restraint system of the vehicle in a second manner based on the seat being at the second location in the vehicle. A system receives data indicating a location of seats in a vehicle and operates an occupant restraint system for the seats using a first set of parameters when the data indicates that a first seat is at a first location, and operates the occupant restraint system for the first seat using a second set of parameters when the data indicates that the first seat is at a second location.

28 Claims, 8 Drawing Sheets

(56) References Cited

U.S. PATENT DOCUMENTS

| | | | |
|---|---|---|---|
| 2013/0289800 A1* | 10/2013 | Gautama | B60R 16/037 |
| | | | 701/2 |
| 2016/0318423 A1* | 11/2016 | Thibault | B62D 33/0617 |
| 2016/0332539 A1* | 11/2016 | Rawlinson | B60N 2/0248 |
| 2016/0347207 A1* | 12/2016 | Kusunose | B60N 2/34 |
| 2018/0105071 A1* | 4/2018 | Lange-Mao | B60N 2/0296 |
| 2018/0154863 A1* | 6/2018 | Watgen | B60N 2/002 |
| 2018/0222349 A1* | 8/2018 | Esslinger | B60N 2/06 |
| 2018/0354391 A1* | 12/2018 | Guy | B60N 2/06 |
| 2019/0239757 A1* | 8/2019 | Berkey | B64D 11/00 |
| 2020/0139852 A1* | 5/2020 | Gao | G06K 7/10366 |
| 2020/0223328 A1* | 7/2020 | Kobayashi | B60K 37/06 |
| 2020/0290549 A1* | 9/2020 | Buice | B60R 21/0136 |
| 2021/0146799 A1* | 5/2021 | Althaus | G01V 3/38 |
| 2021/0245763 A1* | 8/2021 | Gomez | G01S 7/414 |
| 2021/0275368 A1* | 9/2021 | Nagata | B60N 2/062 |
| 2021/0309247 A1* | 10/2021 | Kim | B60W 50/08 |

* cited by examiner

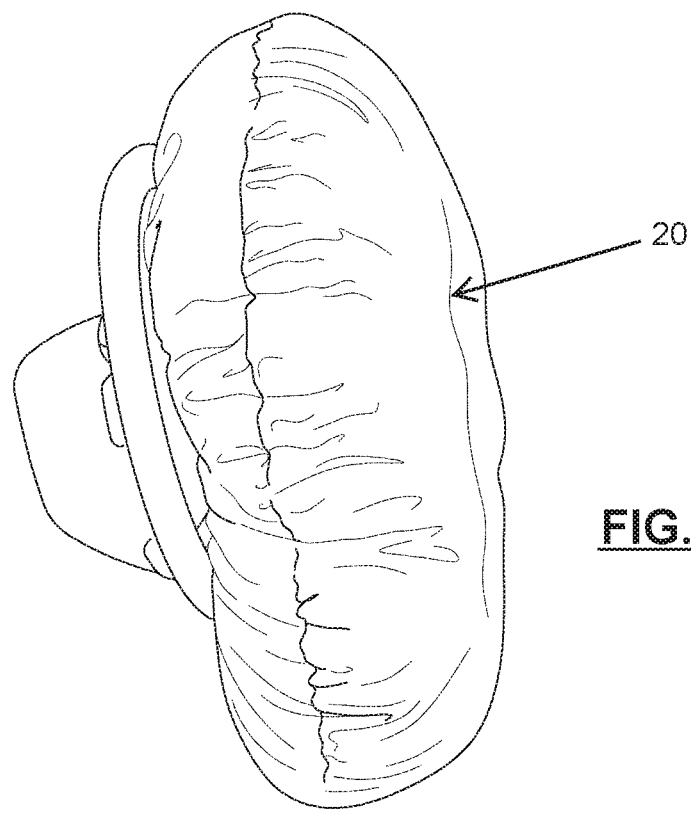
FIG. 2
FIG. 3
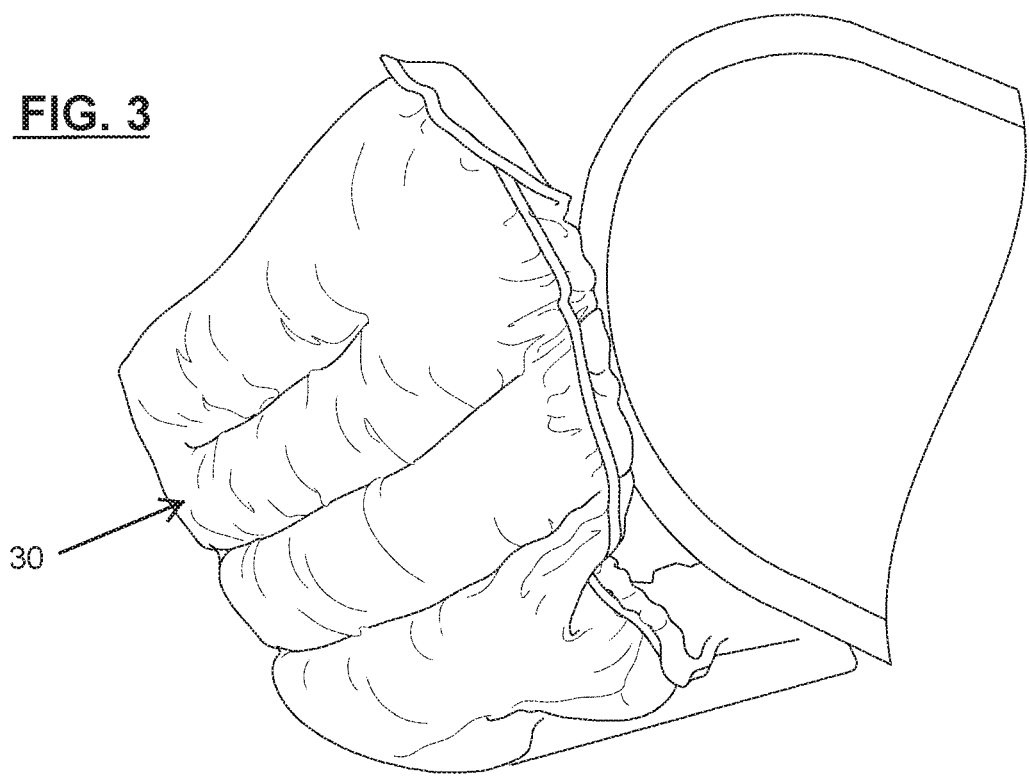

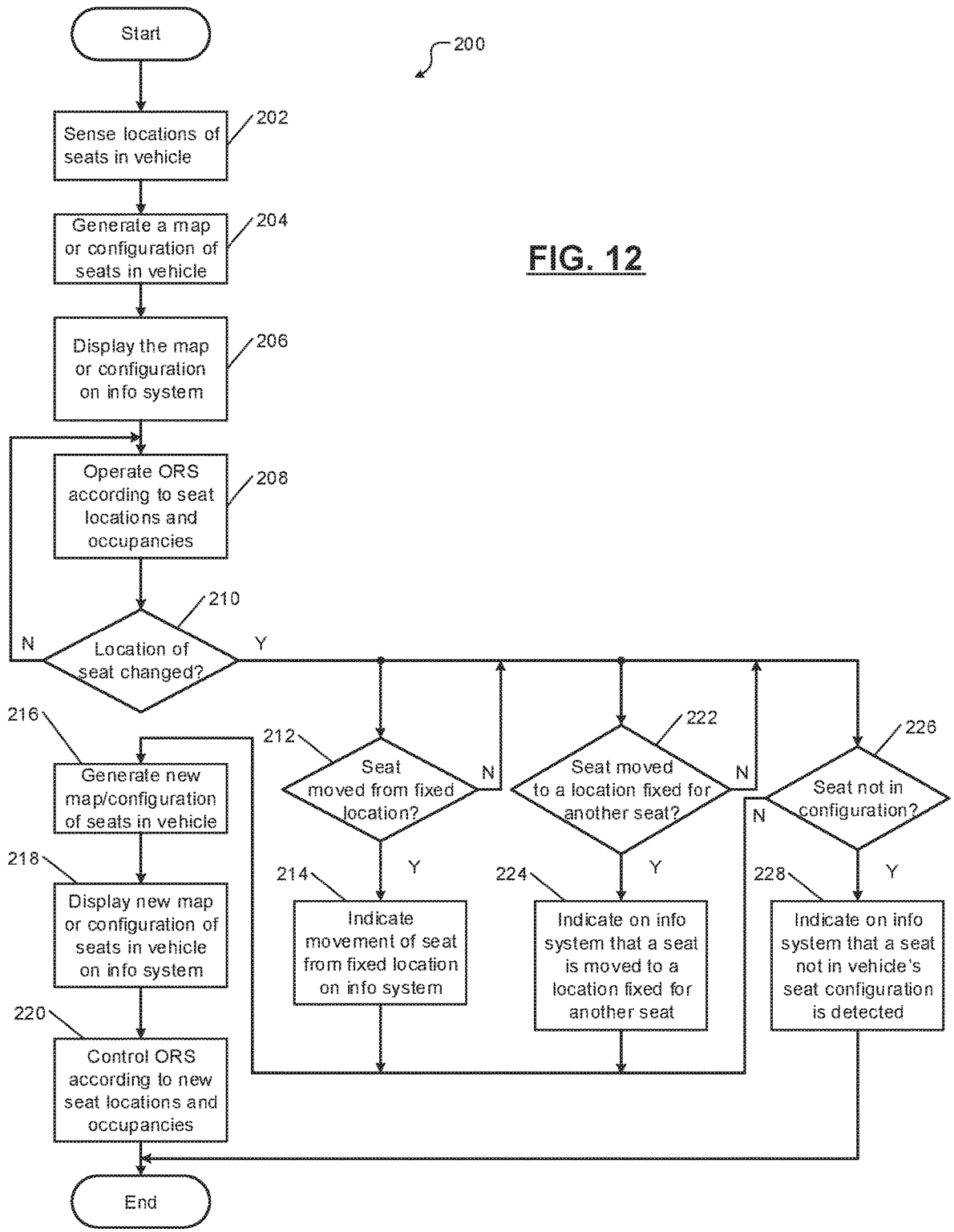

SEAT LOCATION IDENTIFICATION SYSTEM FOR VEHICLES WITH REMOVABLE SEATS

FIELD

The present disclosure relates generally to occupant restraint systems used in vehicles and more particularly to systems and methods for identifying locations of removable seats in vehicles and controlling associated occupant restraint systems based thereon.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Occupant restraint systems include seatbelts and airbags designed to protect occupants of vehicles in traditional seating positions from various types of impacts. Seatbelts may be normally anchored through the upper part of the B-pillar, although some vehicles place the thru-anchor on the top of the seatback. Airbags may be typically located at the steering wheel, the instrument panel, side windows, and between seats and inner panels of doors. When a crash occurs, occupants are moved within the vehicle by the inertial force produced by deceleration due to the crash. The airbags, which are located in line with the forces, may be deployed to prevent the occupants from contacting the vehicle interior or contacting one another.

Self-driving vehicles provide opportunities for non-traditional, flexible seating arrangements (e.g., similar to those in living rooms of homes). In vehicles with removable seats, the seats can be removed from one location and installed in another location. It is not necessary that the seats be keyed or assigned to a specific location.

Movement of a seat within a vehicle may create issues for the vehicle's occupant restraint system, occupant detection system, and belt usage indicators. Without specific seat location information, the belt usage indicator for each specific seat location will not match the actual location of the seat and occupant. While some occupant restraint systems use wireless switches with seatbelt buckles, these switches generally do not provide any specific location based data. Accordingly, for a seat that has been moved and whose new location is unknown, the occupant restraint system associated with that seat may not optimally deploy in the event of a vehicle crash.

One way to prevent this problem from occurring is to make the seats keyed mechanically so that each seat is always returned to a single, dedicated location. Such a rigid scheme, however, forecloses the possibilities for the non-traditional, flexible seating arrangements, which may be more desirable for various vehicles.

SUMMARY

A method comprises sensing when a seat is at a first location in a vehicle, and controlling an occupant restraint system of the vehicle in a first manner based on the seat being at the first location in the vehicle. The method further comprises sensing when the seat is at a second location in the vehicle, and controlling the occupant restraint system of the vehicle in a second manner based on the seat being at the second location in the vehicle. The first manner is different than the second manner.

In other features, controlling the occupant restraint system of the vehicle in a first manner includes controlling at least one passive restraint to deploy, and controlling the occupant restraint system of the vehicle in a second manner includes controlling the at least one passive restraint to remain undeployed.

In other features, the method further comprises sensing a presence of an occupant in the seat when the seat is at the first location or the second location, and operating the occupant restraint system to activate at least one passive restraint associated with the seat based on sensing the presence of the occupant in the seat.

In another feature, the method further comprises controlling an occupant restraint system that is at least partially integrated with the seat.

In other features, the method further comprises designating a fixed location in the vehicle for the seat, detecting a different seat at the fixed location, and indicating presence of the different seat at the fixed location.

In other features, the method further comprises designating a fixed location in the vehicle for the seat, detecting presence of the seat at a different location, and indicating presence of the seat at the different location.

In other features, the method further comprises detecting presence of a second seat at any location in the vehicle, determining whether the second seat is identifiable in a configuration of seats in the vehicle, and providing an indication when the second seat is unidentified in the configuration of the seats in the vehicle.

In still other features, a system comprises a receiver configured to receive data indicating a location of one or more seats in a vehicle. The system further comprises a controller configured to operate an occupant restraint system for the one or more seats using a first set of parameters when the data indicates that a first seat is at a first location in the vehicle. The controller is further configured to operate the occupant restraint system for the first seat using a second set of parameters when the data indicates that the first seat is at a second location in the vehicle.

In other features, the system further comprises a first sensor arranged proximate to the first location in the vehicle. The first sensor is configured to communicate with a device integrated with the first seat, sense the device when the first seat is at the first location in the vehicle, and transmit to the receiver the data indicating that the first seat is at the first location in the vehicle. The system further comprises a second sensor arranged proximate to the second location in the vehicle. The second sensor is configured to communicate with the device integrated with the first seat, sense the device when the first seat is at the second location in the vehicle, and transmit to the receiver the data indicating that the first seat is at the second location in the vehicle.

In other features, the system further comprises a sensor configured to sense presence of an occupant in the first seat when the first seat is at the first location or the second location and to transmit information about whether the occupant is present in the first seat. The receiver is configured to receive the information from the sensor. The controller is configured to operate at least one passive restraint associated with the first seat based on the information received from the sensor.

In another feature, at least a portion of the occupant restraint system is integrated with the first seat.

In other features, the controller is further configured to designate a fixed location in the vehicle for the first seat, detect a different seat at the fixed location based on data about the different seat received from a sensor associated with the fixed location, and indicate presence of the different seat at the fixed location.

In other features, the controller is further configured to designate a fixed location in the vehicle for the first seat, detect presence of the first seat at a different location based on data about the first seat received from a sensor associated with the different location, and indicate presence of the first seat at the different location.

In other features, the controller is further configured to detect presence of a second seat at a third location in the vehicle based on data about the second seat received from a sensor associated with the third location in the vehicle, determine whether the second seat is identifiable in a configuration of seats in the vehicle, and provide an indication when the second seat is unidentified in the configuration of the seats in the vehicle.

In still other features, a system comprises a first device integrated with a first seat in a vehicle. The first device is configured to store first data identifying the first seat. The system further comprises a first sensor arranged proximate to a first location in the vehicle. The first sensor is configured to communicate with the first device and to sense the first data from the first device when the first seat is at the first location in the vehicle. The system further comprises a controller configured to receive the first data from the first sensor, determine that the first seat is at the first location based on receiving the first data from the first sensor, and operate an occupant restraint system for the first seat based on determining that the first seat is at the first location.

In other features, the system further comprises a second sensor arranged proximate to a second location in the vehicle. The second sensor is configured to communicate with the first device and to sense the first data from the first device when the first seat is at the second location in the vehicle. The controller is configured to receive the first data from the second sensor, determine that the first seat is at the second location based on receiving the first data from the second sensor, and operate the occupant restraint system for the first seat based on determining that the first seat is at the second location.

In other features, the system further comprises a second sensor configured to sense presence of an occupant in the first seat when the first seat is at the first location and to transmit information about whether the occupant is present in the first seat. The controller is configured to operate at least one passive restraint associated with the first seat based on the information received from the second sensor.

In other features, the controller is further configured to designate a second location in the vehicle for a second seat, and the system further comprises a second device integrated with the second seat. The second device is configured to store second data identifying the second seat. The first sensor is configured to communicate with the second device and to sense the second data from the second device when the second seat is at the first location in the vehicle. The controller is configured to receive the second data from the first sensor, determine that the second seat is at the first location based on receiving the second data from the first sensor, and indicate presence of the second seat at the first location.

In other features, the controller is further configured to designate a second location in the vehicle for a second seat, and the system further comprises a second device integrated with the second seat. The second device is configured to store second data identifying the second seat. The system further comprises a second sensor arranged proximate to a third location in the vehicle. The second sensor is configured to communicate with the second device and to sense the second data from the second device when the second seat is at the third location in the vehicle. The controller is configured to receive the second data from the second sensor, determine that the second seat is at the third location based on receiving the second data from the second sensor, and indicate presence of the second seat at the third location.

In other features, the first sensor is configured to communicate with a second device integrated with a second seat. The second device is configured to store second data identifying the second seat. The first sensor is configured to sense the second data from the second device when the second seat is at the first location in the vehicle. The controller is configured to receive the second data from the first sensor, determine whether the second seat belongs to the vehicle, and provide an indication when the second seat does not belong to the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 2-4 show examples of airbags used in a vehicle;

FIG. 12 shows a flowchart of a method for tracking movement of seats in a vehicle and controlling the occupant restraint system in the vehicle according to the seat locations.

In the drawings, reference numbers may be reused to identify similar and/or identical elements.

DETAILED DESCRIPTION

The present disclosure proposes systems and methods for detecting seat locations when seats in a vehicle are moved from one location to another. For example, the systems and methods use near field communication sensors to sense the seat locations. With the locations of the seats known regardless of their movement, the occupant restraint system associated with each seat is correctly deployed in the event of a crash.

Further, if a seat is assigned a fixed location, and if the seat is moved from the fixed location to a new location, the new location of the seat is identified, and a warning is provided on the vehicle's information system. Furthermore, if a seat from another vehicle is installed in the vehicle, the seat is identified as being from another vehicle along with its location, and a warning is provided on the vehicle's information system. These and other features of the systems and methods of the present disclosure are described below in detail.

Figure 1:
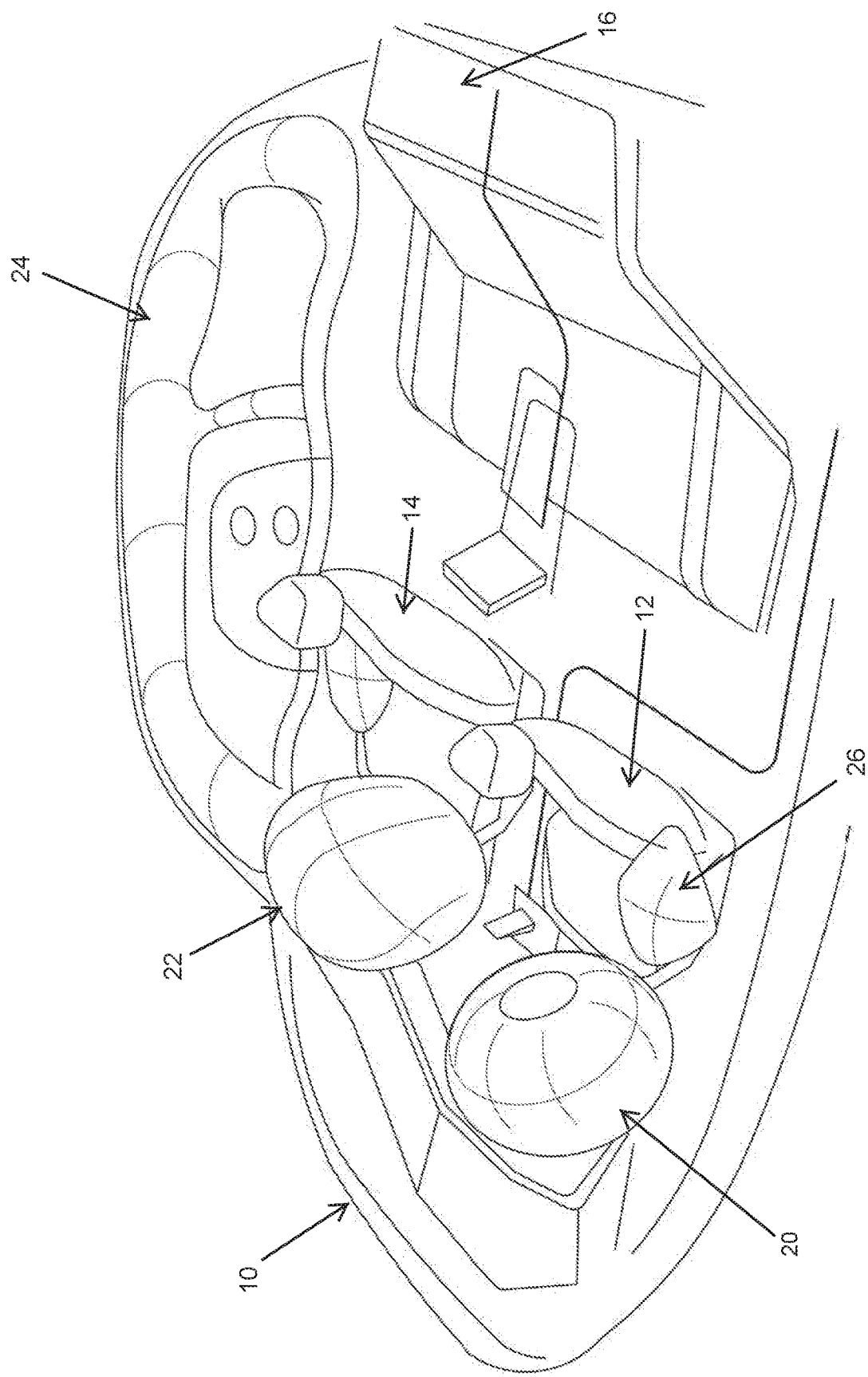
FIG. 1 shows an example of an occupant restraint system used in a vehicle.
Figure 4:
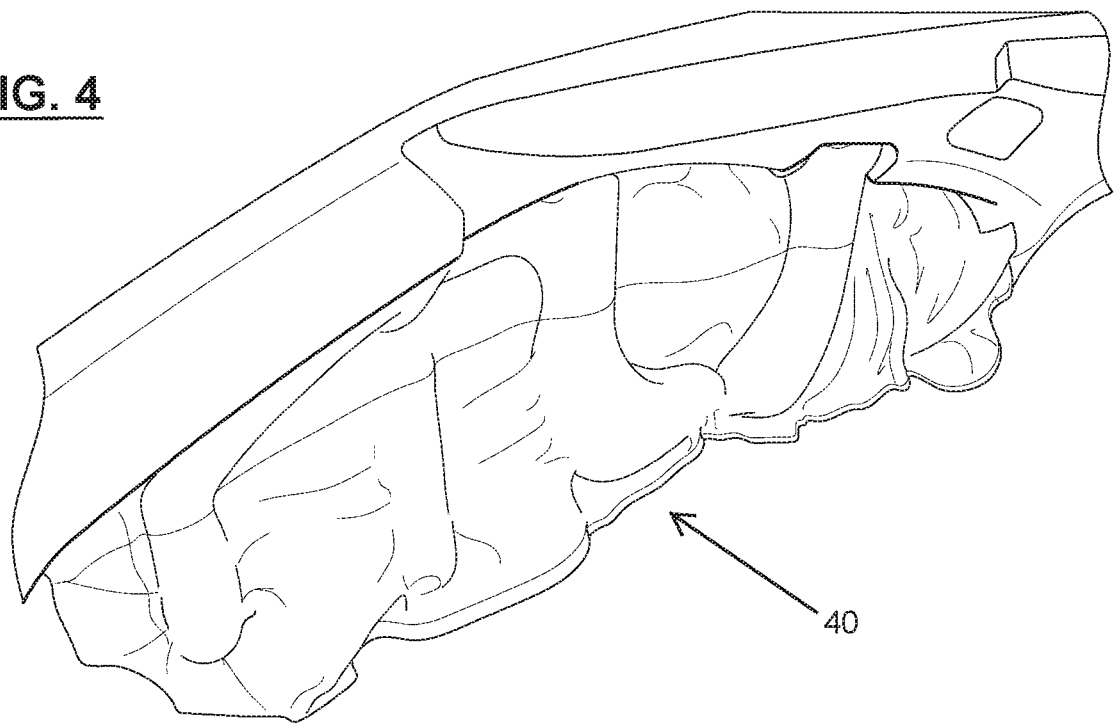
Figure 5:
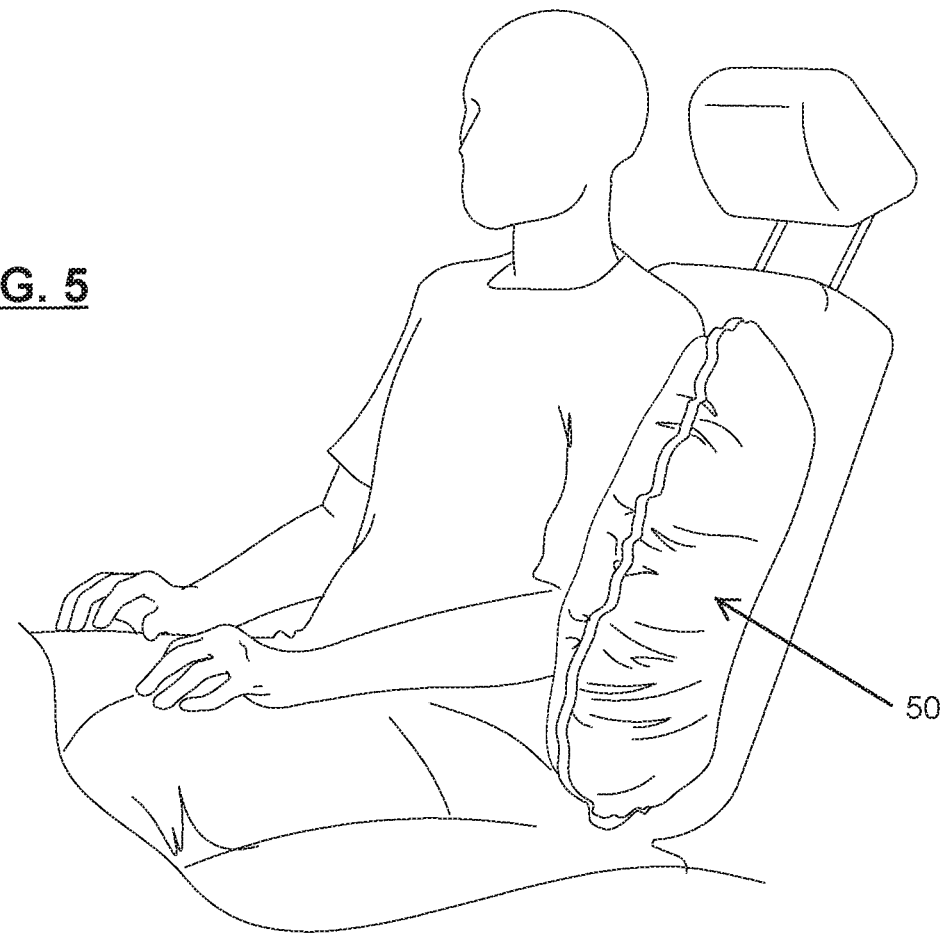
FIGS. 5 and 6 show examples of seats with integrated airbags.
Figure 6:
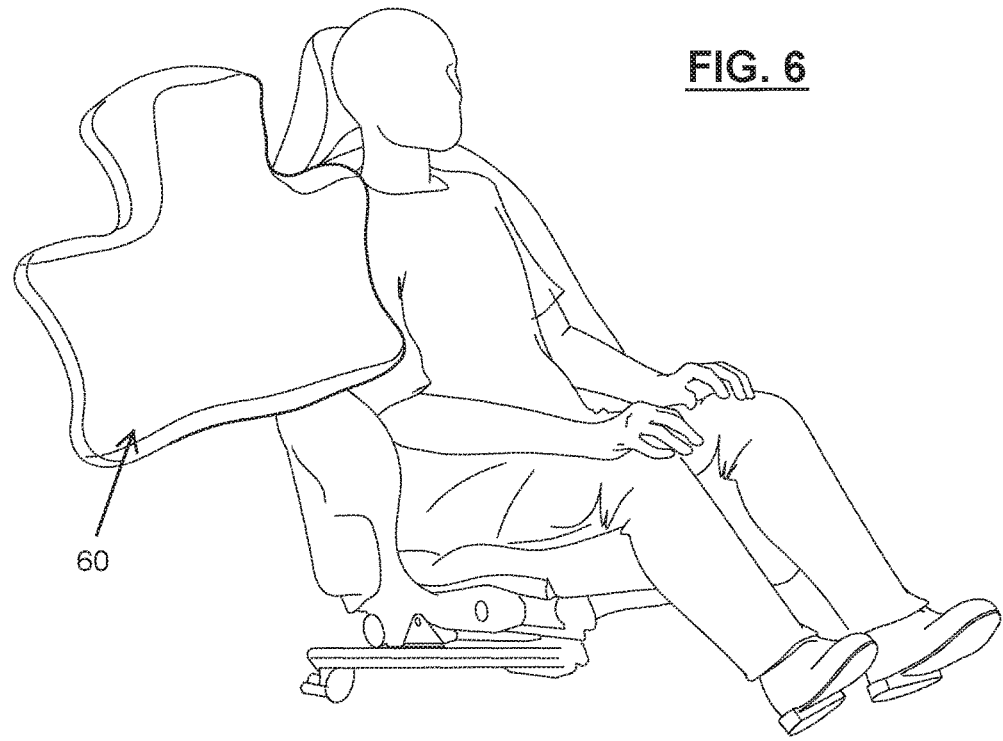
Figure 7:
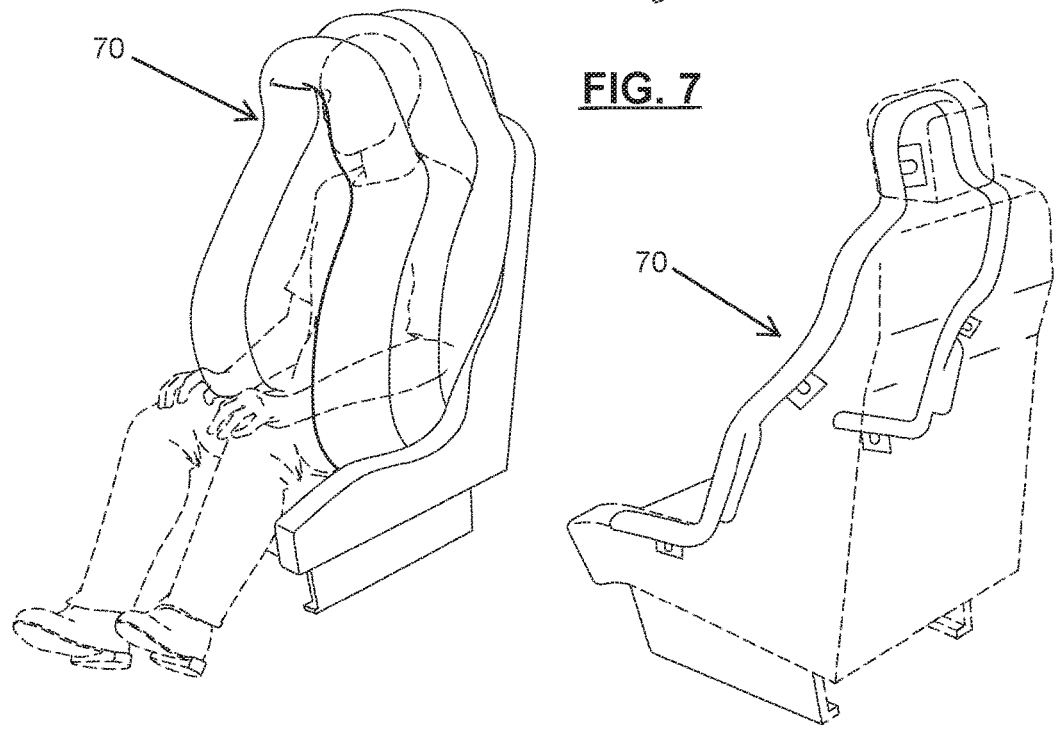
FIG. 7 shows an example of a seat with an integrated life cell airbag.
Figure 8:
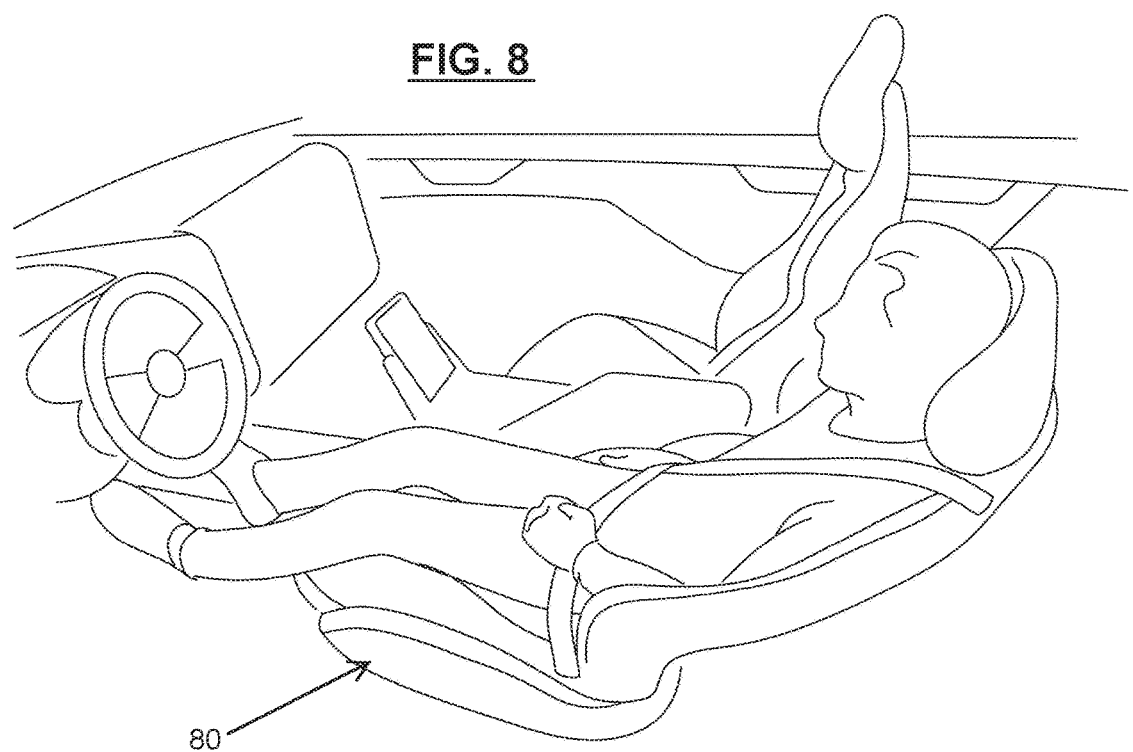
FIG. 8 shows an example of a seat that can be reclined in a vehicle.
Figure 9:
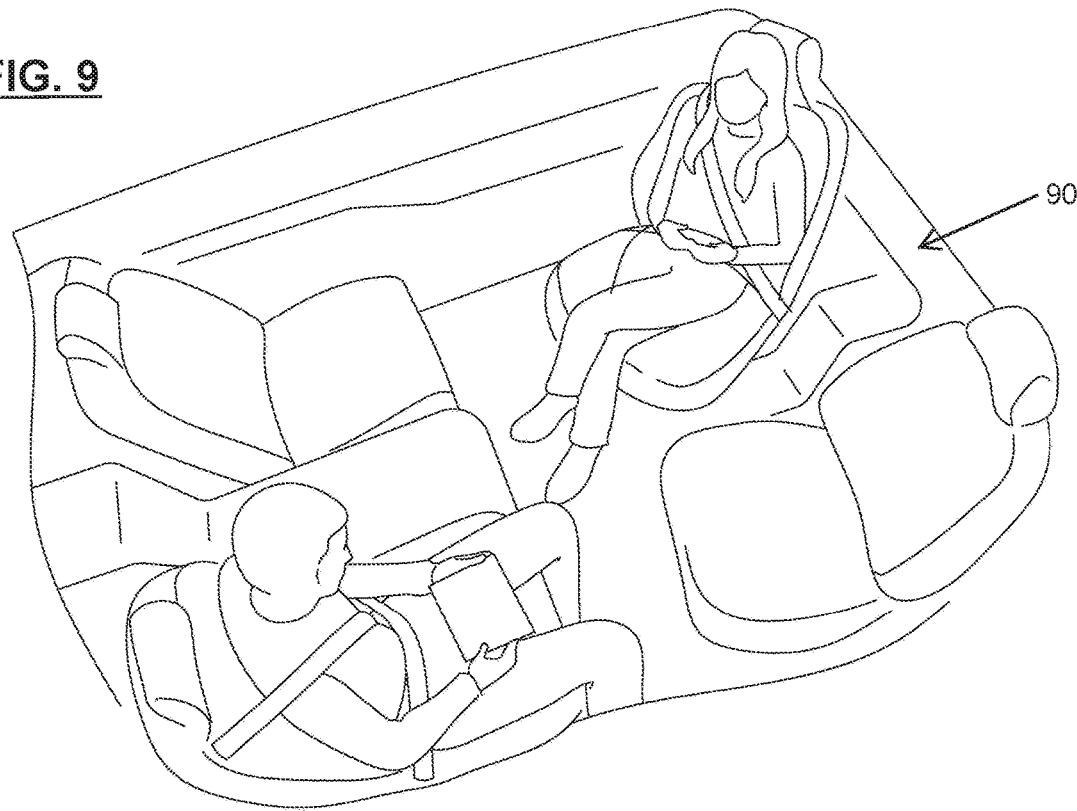
FIG. 9 shows an example of a flexible arrangement of seats in a vehicle.

The present disclosure is organized as follows. FIG. 1 shows an example of an occupant restraint system. FIGS. 2-4 show examples of airbags. FIGS. 5 and 6 show examples of seats with integrated airbags. FIG. 7 shows an example of a seat with an integrated life cell airbag. These examples are shown and initially described below to illustrate the need to identify the seat locations so that an appropriate restraint, including but not limited to an airbag, may be properly deployed based on the identified seat location in the event of a crash. FIG. 8 shows an example of a seat that can be reclined. FIG. 9 shows an example of a flexible arrangement of seats in a vehicle.

Figure 10:
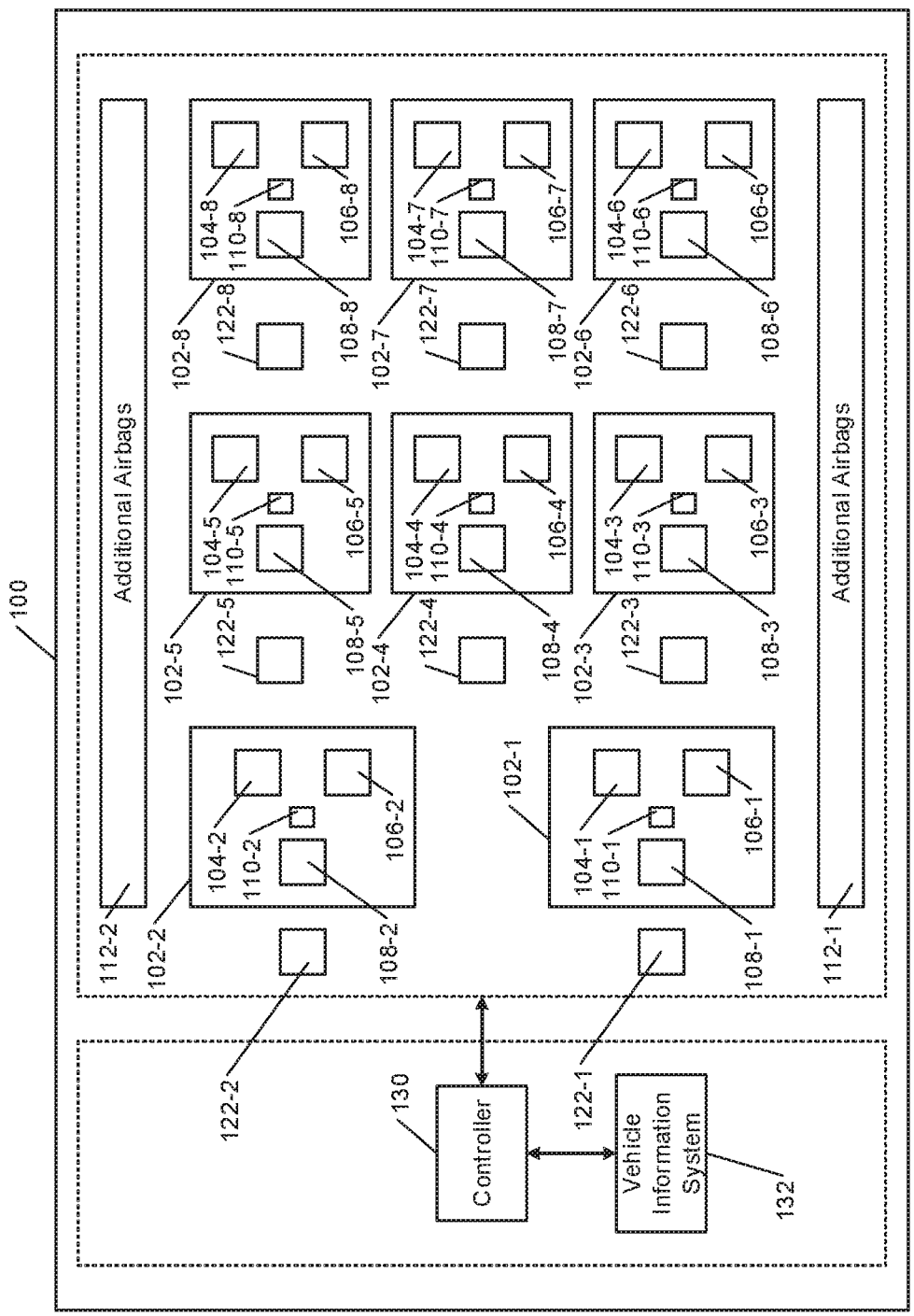
FIG. 10 shows a schematic of an example of a seating arrangement with removable seats in a vehicle.
Figure 11:
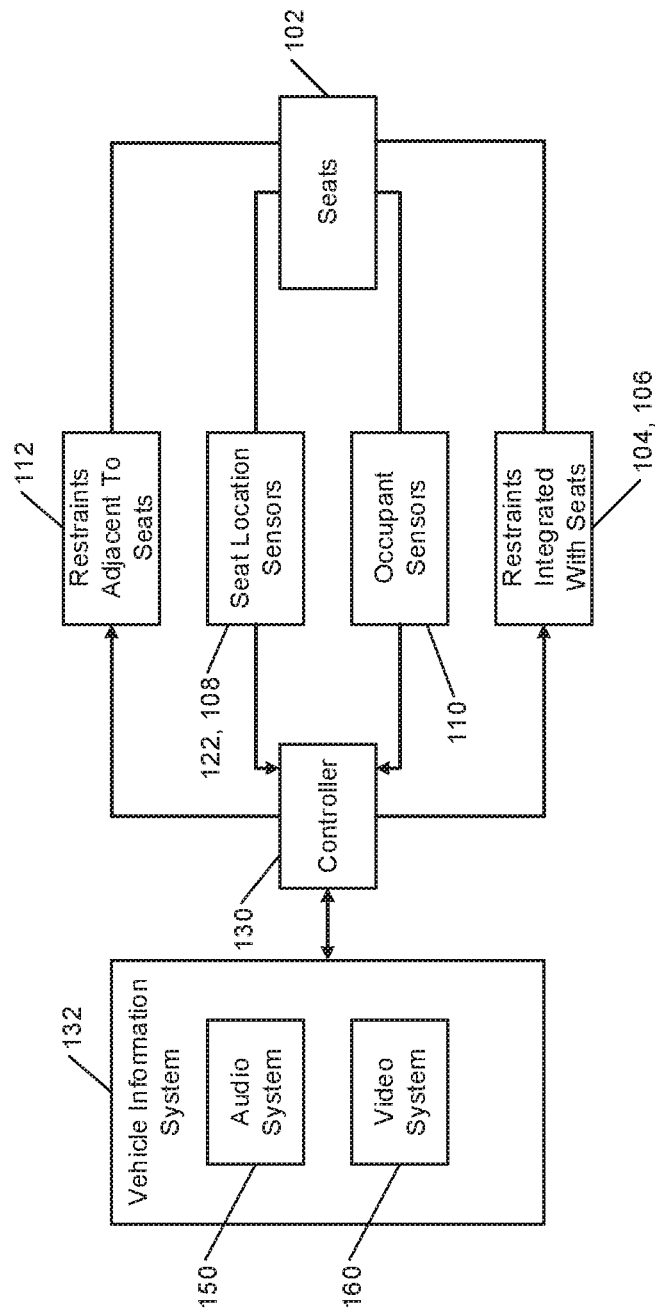
FIG. 11 shows a block diagram of a system for tracking movement of seats in a vehicle and controlling the occupant restraint system in the vehicle according to the seat locations.

FIG. 10 shows an example of a flexible seating arrangement with removable seats in a vehicle along with a system for tracking movements of the removable seats and controlling the occupant restraint system of the vehicle according to the seat locations. FIG. 11 shows a block diagram of the system for tracking movements of the removable seats and controlling the occupant restraint system of the vehicle according to the seat locations. FIG. 12 shows a flowchart of a method for tracking movements of the removable seats and controlling the occupant restraint system of the vehicle according to the seat locations.

FIG. 1 shows an example of an occupant restraint system of a vehicle 10. For example only, the vehicle 10 includes a first front passenger seat 12, a second front passenger seat 14, and a plurality of rear passenger seats generally identified at 16. The first front passenger seat 12 may be a driver seat 12. In some applications, the vehicle 10 may be fully autonomous and not have a designated driver seat. For example only, the vehicle 10 includes frontal airbags 20 and 22, respectively, for the driver and the front passenger, a side impact airbag 24 for the front and rear passengers, and an additional side airbag 26 for the driver.

FIG. 2 shows an example of the frontal airbag 20 for the driver, which is generally called the driver airbag 20. The driver airbag 20 is located in the steering wheel of the vehicle 10. The frontal airbag 22 for the front passenger, which is generally called the passenger airbag 22, is located in the front panel of the vehicle 10 (not shown). The passenger airbag 22 is generally deployed in the event of a crash only when a front passenger occupies the front passenger seat 14. The presence of the front passenger in the front passenger seat 14 may be sensed using a sensor installed in the front passenger seat 14 (shown and described with reference to FIG. 10 below), for example.

For example, the frontal airbags 20, 22 may be typically deployed in less than 50 milliseconds. For example, according to regulations, airbags for side protection (e.g., the side impact airbag 24 shown in FIG. 1) have to be fully inflated within 15 milliseconds, which, for perspective, is eight times faster than the blink of an eye. Once an airbag deploys, deflation begins immediately as the airbag absorbs energy from an impact and the gas escapes through vent holes in the fabric of the airbag. For example, the frontal airbag (e.g., the frontal airbags 20, 22) may be empty after approximately one second.

FIG. 3 shows an example of a knee airbag 30. On the front passenger side, the knee airbag 30 is usually mounted below the glove box. The knee airbag 30 reduces leg injuries and additionally provides benefits for the head and chest by keeping the occupant in a proper position to receive maximum protection afforded by other occupant restraints of the vehicle 10, including the frontal airbag 22.

FIG. 4 shows an example of a side curtain airbag 40. The side curtain airbag 40 forms a cushion between an occupant and a window, which may protect an occupant's head from striking the side of the vehicle 10 or from intruding vehicles in the event of vehicle rollover or side impact collision. Some convertible vehicles are equipped with a specially designed door mounted inflatable curtain airbag. This airbag can be deployed in different situations, such as rollovers, since the airbag can hold the occupants safely inside the vehicle in many severe accidents.

FIG. 5 shows an example of a side airbag 50 that is integrated with a seat. That is, the side airbag 50 moves with the seat if the seat is moved to another location in the vehicle 10. There are different types of side airbags, which include, for example, thorax side airbags, head thorax side airbags, and pelvis thorax side airbags.

The thorax side airbag usually has a volume of only 8 to 12 liters, for example, to make it as gentle as possible but still efficient enough to provide the required protection. The thorax side airbag is inflated typically within 12 thousandths of a second, for example, which is approximately four times faster than a frontal airbag.

The head thorax side airbag may combine head and thorax protection in side impact collisions for one occupant and may be used where the inflatable curtain (which also provides protection in rollovers as well as for near-seat occupants) cannot be mounted, such as in convertible cars.

The pelvis thorax side airbag are designed to reduce the risk of injury to the thorax and pelvic regions. To achieve this protection, the airbag coverage area is extended by adding a cell which is inflated to a higher pressure in order to distribute the load over the occupant's thorax and pelvic region more efficiently. The pelvis thorax airbag is located in the back-rest frame of the seat.

FIG. 6 shows an example of a front center airbag 60. A far-side impact is a collision that impacts the opposite side of the vehicle relative to the occupant. Far-side impacts can induce injuries through excessive neck/spine bending in a single-driver scenario or through driver-to-passenger contact in a dual-occupant scenario. The front center airbag 60 is mounted on the inboard side of the driver's seat and protects against both single-occupant and dual-occupant scenarios.

FIG. 7 shows an example of a seat with an integrated life cell airbag 70 that provides protection regardless of how a vehicle occupant is seated, including the seat orientation in proximity to the steering wheel, and seatback angle (pitched forward or leaning backwards). Once fully activated in concert with the deployment of the steering wheel airbag (e.g., the driver airbag 20 shown in FIG. 2), the life cell airbag 70 resembles a protective cocoon. The design of the life cell airbag 70 also enables far-side protection for the occupant and can counteract the velocity impact of free-flying objects, such as unbuckled backseat occupants or loose items not secured in the vehicle, from further injuring the driver.

FIG. 8 shows an example of a seat 80 that can be deeply reclined. While not shown, the front passenger seat may also be similarly reclined. A reclined posture can increase the likelihood of submarining. The seat belts and airbags associated with these seats can be configured to deploy differently when these seats are reclined than when they are in their standard upright positions.

FIG. 9 shows an example of a flexible, living-room style arrangement 90 of seats in a vehicle. As shown, some of the seats may be front-facing while others may be rear-facing. Further, some of the seats may be reclined while others may be rotated. The occupants in the rotated seats have no airbags directly in front, and a seatbelt anchored onto the B-pillar cannot be routed to restrain them in their initial position. Furthermore, some of these seats may be assigned fixed locations while others may be removable and can be moved from one location to another in the vehicle. Accordingly, the occupant restraint system such as seat belts and airbags integrated with as well as surrounding such seats needs to be activated differently depending on seat locations as described below in detail.

For completeness, a brief description of inflators used with airbags follows. Inflators are used to fill the airbag cushion during a crash. Inflators produce a quantity of gas, with a certain composition and temperature, at a controlled rate, which then fills the airbag system to sufficiently cushion an occupant from certain injury scenarios. Inflators can be of different type. For example, inflators can include pyrotechnic inflators, stored gas inflators, or hybrid inflators.

Pyrotechnic is a chemical material that burns at a controlled rate to produce gas, heat or particles. A gas generant is a pyrotechnic whose primary output is gas. Pyrotechnic inflators contain a core of solid gas generant. During a crash, this generant is ignited and produces a harmless nitrogen-based gas as it burns. This gas is then forced through filters in the inflator which cool the gas and remove particulates. As the gas exits the inflator, it enters the airbag cushion and deploys it in time to provide lifesaving protection for the vehicle's occupants.

In stored gas inflators, gas to inflate airbags is produced by a controlled release of gas that is stored at a high pressure. The stored gas designs rely on compressed gas to deploy the airbag. A hybrid inflator features a combination of pyrotechnic and stored gas technologies. The hybrid designs use an internal pyrotechnic heating device to compensate for the cooling effect resulting from the expansion of the compressed gas when the airbag deploys. Side impact and head protection inflators use stored gas to inflate the restraints. These stored gas technologies offer a cooler gas alternative to solid pyrotechnic inflators.

Initiators and micro gas generators are components of the inflators that are critical to the ignition process which causes an airbag to deploy. The initiator or gas generant is ignited using electrically triggered initiators which provide a reliable, tunable ignition of the individual shapes of airbag inflator sequences. The micro gas generators utilize an inflation method. Their smaller size allows them to be integrated into seat belt pre-tensioning products.

Working together with airbags in a collision, seatbelts provide occupants with an added safety and can guard from potential further injury. Seatbelts include a variety of components such as retractors, buckles, load limiters, pre-tensioners, and so on. The occupant restraint system described below controls one or more parameters of the airbags and seatbelts described above and operates these restraints based on the locations and occupancy of the seats sensed by the occupant restraint system.

In view of the layout of airbags in vehicles (shown in FIG. 1), the various types of airbags shown in FIGS. 2-7, and the possible seat arrangements (shown in FIGS. 8 and 9), the present disclosure provides the following systems and methods for identifying locations of removable seats in vehicles and controlling occupant restraint systems in the vehicles based thereon as described below in detail.

FIG. 10 shows an example of a schematic representation of a seating arrangement with removable seats in a vehicle 100 and a system for tracking locations of removable seats and operating the occupant restraint system of the vehicle 100 according to the seat locations. Communications between various components of the system are shown in FIG. 11.

For example only, the vehicle 100 comprises a driver seat 102-1, a front passenger seat 102-2, and a plurality of rear passenger seats 102-3, 102-4, . . . , and 102-8 (collectively seats 102). It is to be understood that the vehicle 100 can comprise any number of seats. It is further to be understood that any of the seats 102 may include seats having configurations as shown in FIGS. 5-7. Further, the seats 102 may be arranged in manner, for example, as shown in FIGS. 8 and 9.

Each of the seats 102 may comprise or be associated with a seatbelt, an airbag, a device that communicates with a floor-mounted sensor compliant with a near field communication protocol (explained below in detail), and a weight sensor to detect presence of an occupant. It should be noted that while all the seats 102 are shown as being nearly identical and including an airbag (element 106 described below), in practice, in some vehicles, not all the seats 102 will include an airbag and/or may not be otherwise associated with an airbag. Further, the layout and configuration of other airbags in the vehicle (elements 112 described below) may differ. Accordingly, if the location of each seat 102 is known, appropriate airbags (elements 106 and/or 112) may be deployed in the event of a crash, depending on whether a seat 102 includes an airbag, where the seat 102 is located in the vehicle 100, and whether the seat is occupied by a vehicle passenger.

For example, the seat 102-1 may comprise a seatbelt 104-1, an airbag 106-1, a device 108-1, and a weight sensor 110-1; the seat 102-2 may comprise a seatbelt 104-1, an airbag 106-2, a device 108-2, and a weight sensor 110-2; and so on. In general, a seat 102-$n$ may comprise a seatbelt 104-$n$, an airbag 106-$n$, a device 108-$n$, and a weight sensor 110-$n$, where n denotes the number of the seat 102.

Hereinafter, the seatbelts 104-1, 104-2, and so on are collectively called the seatbelts 104; the airbags 106-1, 106-2, and so on are collectively called the airbags 106; the devices 108-1, 108-2, and so on are collectively called the devices 108; and the weight sensors 110-1, 110-2, and so on are collectively called the weight sensors 110. For example, the airbags 106 may include airbags such as those shown in FIGS. 2, 3, and 5-7.

As noted above, the vehicle 100 may be include additional airbags that are not integrated with the seats 102. For example only, two additional airbags are schematically shown at 112-1 and 112-2, which are collectively called the airbags 112. For example, the airbags 112 may comprise any of the airbags shown in FIGS. 3 and 4 as well as the airbag 24 shown in FIG. 1. Collectively, the seatbelts 104 and the airbags 106 and 112 constitute the occupant restraint system of the vehicle 100, which is hereinafter called the occupant restraint system 120.

In addition, the vehicle 100 comprises near field sensors 122-1, 122-2, and so on, which are hereinafter collectively called the near field sensors 122. The near field sensors 122 are arranged proximate to the seats 102 (e.g., on the floor of the vehicle 100 in front of the seats 102) and are configured to communicate with the devices 108 mounted to or in the seats 102.

For example, the near field sensor 122-1 is arranged proximate to the seat 102-1 and is configured to communicate with the device 108-1 in the seat 102-1, or with the device 108-$i$ of any other seat 102-$i$ when the seat 102-$i$ is moved to the location of the seat 102-1; the near field sensor 122-2 is arranged proximate to the seat 102-2 and is configured to communicate with the device 108-2 in the seat 102-2, or with the device 108-$i$ of any other seat 102-$i$ when the seat 102-$i$ is moved to the location of the seat 102-2; and so on.

The near field sensors 122 remain stationary at their respective locations in the vehicle 100 while the seats 102 are removable and may be moved from one location to another. The near field sensors 122 track the movement of the seats 102 as follows.

For example only, the near field sensors 122 and the devices 108 may utilize any near field, close range, or short range wireless communication systems such as but not limited to RFID. In some examples, the near field sensor 122-$i$ mounted adjacent to the seat 102-$i$ may receive a short range signal from the device 108-$i$ in the seat 108-$i$. In some examples, the near field sensor 122-$i$ mounted adjacent to the seat 102-$i$ may transmit a short range signal to the device 108-$i$ in the seat 108-$i$ and may receive a signal transmitted as a response by the device 108-$i$. Other types of sensing communications between the near field sensors 122 and the devices 108 are contemplated. Based on the communications between the near field sensors 122 and the devices 108, each seat 102 can be identified when returned to a location.

For example, each seat 102 may be configured to include an RFID or other type of close range device 108 mounted to it. The device 108 in the seat 102 is configured to provide a serial number that can be accessed by the near field sensor 122. The near field sensor 122 can include floor mounted transmitter or receiver located in the floor of the vehicle 100 at each specific seat location. Each seat 102 can be serialized, and each floor location that includes the near field sensor 122 can also be serialized. The serial numbers of the seat 102 and the floor location do not need to match. Any seat 102 can go in any location.

Since each seat 102 has an assigned serial number and since near field sensors 122 are also identified by their respective serial numbers and are stationed at fixed locations, the near field sensor 122-$i$ can detect any seat 102-$n$ when the seat 102-$n$ is moved to the location proximate to the near field sensor 122-$i$.

For example, suppose that the seats 102 are at locations shown in FIG. 10. The near field sensor 122-1 senses the location of the seat 102-1 by communicating with the device 108-1 in the seat 102-1 and by obtaining the serial number of the seat 102-1 from the device 108-1; the near field sensor 122-2 senses the location of the seat 102-2 by communicating with the device 108-2 in the seat 102-2 and by obtaining the serial number of the seat 102-2 from the device 108-2; and so on.

The vehicle 100 further comprises a controller 130 and a vehicle information system 132 (also called a driver information center). The controller 130 communicates with the near field sensors 122 and the weight sensors 110 and controls the occupant restraint system 120 as follows. The communications between the controller 130 and the near field sensors 122 and the weight sensors 110 are shown in FIG. 11.

The controller 130 receives the serial numbers of the seats 102 from the near field sensors 122. The controller 130 knows the locations of the near field sensors 122 since the near field sensors 122 are identified by their respective serial numbers and since the locations of the near field sensors 122 are fixed in the vehicle 100. Based on the data sensed by the near field sensors 122 from the seats 102, the controller 130 now knows the locations of the seats 102 (e.g., as shown in FIG. 10). The controller 130 can generate a map of the locations of the seats 102 and may display the map indicating the locations of the seats 102 on a display system (shown in FIG. 11) of the vehicle information system 132.

Now suppose that, for example, the positions of the seats 102-3 and 102-4 are swapped. The near field sensor 122-3, which earlier sensed the seat 102-3 and reported its location to the controller 130 now senses the seat 102-4 and reports its new location to the controller 130. The near field sensor 122-4, which earlier sensed the seat 102-4 and reported its location to the controller 130 now senses the seat 102-3 and reports its new location to the controller 130. The controller 130 can generate an updated map of the new locations of the seats 102 and may display the map indicating the new locations of the seats 102 on the display system of the vehicle information system 132.

Thus, the controller 130 knows which seat 102 is exactly at which location in the vehicle 100, and the controller 130 configures the vehicle information system 132 to display the proper seat location. Further, the controller 130 can learn which of the seats 102 are occupied based on data received from the weight sensors 110 from the seats 102. The controller 130 can therefore also indicate which of the seats 102 are occupied in the map of the locations of the seats 102 that is displayed on the display system of the vehicle information system 132.

The controller 130 can control the occupant restraint system 120 based on the locations of the seats 102 and depending on which of the seats 102 are occupied. For example, the controller 130 can control one or more parameters of the airbags 106 and 112 (e.g., speed of deployment, rate of inflation, or whether to deploy at all in case of a crash) based on the locations of the seats 102 and depending on whether the seats 102 are occupied.

For example, an airbag associated with a seat 102 that is not occupied may not be deployed in the event of a crash. For example, an airbag associated with a seat 102 may be deployed at a different rate depending on the location of the seat 102 (e.g., depending on whether other airbags also surround the seat 102 at that location). For example, an airbag associated with a seat 102 may not be deployed depending on the location of the seat 102 (e.g., since another airbag such as the airbag 24 can be deployed and can provide sufficient protection). For example, an airbag associated with a seat 102 may not be deployed depending on the occupant data for the seat 102 (e.g., if a child occupies the seat 102); and so on.

Due to the ability to sense which seat is in which location as described above, the controller 130 can also generate a warning if a seat 102 is returned to a non-preferred location (e.g., outboard seats with airbags). For example, one of the seats 102 may be designated a fixed location. If that seat 102 is moved to another location, the controller 130 can generate a warning. Further, if another seat 102 is moved to the fixed location that is designated for the seat 102, the controller 130 can generate a warning. Furthermore, since the seats 102 are serialized, if a seat from another vehicle is moved to a seat location in the vehicle 100, the controller 130 can detect that seat as not belonging to the vehicle 100 (i.e., the serial number of that seat is not recognized in the configuration of the seats 102 of the vehicle 100) and can generate a warning.

FIG. 11 shows a block diagram of the system for tracking locations of removable seats 102 and operating the occupant restraint system 120 according to the seat locations in the vehicle 100. The system comprises the controller 130 and the vehicle information system 132. The seats 102 are shown only for completeness of illustration, and it is to be understood that elements 104, 106, 108, 110, 112, and 122 are arranged relative to (i.e., integrated with or around) the seats 102 as shown in detail in FIG. 10.

The system further comprises seat location sensors shown as 122, 108 since the seat location sensors include the near field sensors 122 adjacent to the seats 102 and the devices 108 in the seats 102 as shown in FIG. 10. The system further comprises occupant sensors shown as 110 since the occupant sensors include the weight sensors 110 in the seats 102 as shown in FIG. 10.

The system further comprises restraints integrated with the seats 102 shown as 104, 106 since the restraints integrated with the seats 102 include the seatbelts 104 and the airbags 106 associated with the seats 102 as shown in FIG. 10. Examples of the airbags 106 are shown in FIGS. 4-7. The system further comprises restraints adjacent to the seats 102 shown as the airbags 112 in FIG. 10, examples of which include the airbags shown in FIGS. 1 and 3-4.

As described above with reference to FIG. 10, the controller 130 communicates with the seat location sensors shown as 122, 108 to identify locations of the seats 102 and to track the movement of the seats 102. The controller 130 identifies presence or absence of occupants in the seats 102 using the occupant sensors, which include the weight sensors 110 in the seats 102 as shown in FIG. 10.

Based on the data received from the seat location sensors shown as 122, 108 and the occupant sensors (e.g., the weight sensors 110), the controller 130 controls the occupant restraint system 120 comprising the restraints integrated with the seats 102 shown as the seatbelts 104 and the airbags 106, examples of which are shown in FIGS. 5-7. Further, based on the data received from the seat location sensors shown as 122, 108 and the occupant sensors (e.g., the weight sensors 110), the controller 130 controls the occupant restraint system 120 comprising the restraints adjacent to the seats 102 shown as 112 in FIG. 10, examples of which include airbags shown in FIGS. 1 and 3-4. These operations of the controller 130 are already described in detail with reference to FIG. 10 above and are therefore omitted for brevity.

While not shown, the controller 130 also comprises activating apparatuses such as inflators described above for deploying the various airbags 106, 112 of the vehicle 100. The vehicle information system 132 comprises an audio system 150 and a video system 160. The audio system 150 comprises a speaker system through which the controller 130 can output audio messages such as the warnings described above. The video system 160 comprises a display and a plurality of visual indicators through which the controller 130 can output visual messages such as the warnings described above.

FIG. 12 shows a flowchart of a method 200 for tracking locations of removable seats and controlling the occupant restraint system according to the seat locations. For example, the method 200 is executed by a processor and a memory comprised in the controller 130. For example, the term control used in the following description refers to a software program comprising instructions stored in the memory in the controller 130 and executed by the processor in the controller 130.

At 202, control senses the locations of all the seats in the vehicle. At 204, control generates a map or a configuration of the seats in the vehicle. At 206, control displays the map or the configuration of the seats on the vehicle information system. At 208, control operates the occupant restraint system of the vehicle according to the locations of the seats and based on sensing the presence or absence of occupants in the seats.

At 210, control determines if a seat location has changed (e.g., if a seat has been moved from one location to another location) based on data received from the near field sensors as described above. Control returns to 208 if the seat locations are unchanged.

At 212, if a change in a seat location is sensed, control further determines if a seat has been moved from a fixed location (i.e., from a location designated as a fixed location or a preferred location for the seat). At 214, if the seat has been moved from a fixed location, control generates an indication (e.g., an audio or a visual indication) on the vehicle information system to indicate the movement of the seat from the fixed location to a new location. Since control also senses the new location to which the seat has been moved, control may also provide an indication (e.g., an audio or a visual indication) on the vehicle information system to indicate the new location of the seat.

Subsequently, at 216, control generates a new map or a new configuration of the seats in the vehicle, which includes the new locations or arrangement of the seats after the movement of the seat. At 218, control displays the new map or the new configuration of the seats on the vehicle information system. At 220, control operates the occupant restraint system of the vehicle according to the new locations of the seats and based on sensing the presence or absence of occupants in the seats.

At 222, if control determines at 212 that the seat is not moved from a fixed location, control further determines if the seat has been moved to a location that is fixed for another seat. At 224, if the seat has been moved to a location that is fixed for another seat, control generates an indication (e.g., an audio or a visual indication) on the vehicle information system to indicate the movement of the seat to a new location that is fixed for another seat. Since control also senses the new location to which the seat has been moved, control may also provide an indication (e.g., an audio or a visual indication) on the vehicle information system to indicate the new location of the seat. Thereafter, control proceeds to 216.

At 226, if control determines at 212 and 222 that the sensed seat is neither moved from a fixed location to a new location nor moved to a location that is fixed for another seat, control further determines if the seat belongs to the vehicle at all. That is, control determines, based on the serial number sensed from the seat, if the seat is one of the seats known (recognized) in the configuration of the seats in the vehicle (based on the known serial numbers of the seats in the vehicle). Essentially, control determines if the seat is from another vehicle. If the seat belongs to the vehicle and is not from another vehicle, control proceeds to 216. If the seat does not belong to the vehicle and is from another vehicle, control indicates on the vehicle information system that the seat is not in the configuration of seats in the vehicle, and the method 200 ends.

Note that the steps 212, 222, and 226 need not be performed in any order. Rather, the steps 212, 222, and 226 can be performed in parallel. Further, after steps 214 and 224, control may not continue to 216 until the seats are returned to their respective correct positions. Further, after step 228, while not shown, control may proceed to 216 after the seat from another vehicle is removed from the vehicle.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip (SoC).

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A method comprising:
providing a first location for installing a first seat in a vehicle and a second location for installing a second seat in the vehicle, the second seat being different than the first seat, and the second location being different than the first location;
sensing when the first seat is at the first location;
controlling an occupant restraint system of the vehicle in a first manner based on the first seat being at the first location in the vehicle;
removing the first seat from the first location and installing the first seat at the second location of the second seat;
sensing when the first seat is removed from the first location and installed at the second location of the second seat in the vehicle; and
controlling the occupant restraint system of the vehicle in a second manner based on the first seat being at the second location of the second seat in the vehicle, the first manner being different than the second manner.

2. The method of claim 1 wherein controlling the occupant restraint system of the vehicle in the first manner includes controlling at least one passive restraint to deploy and controlling the occupant restraint system of the vehicle in the second manner includes controlling the at least one passive restraint to remain undeployed.

3. The method of claim 1 further comprising:
sensing a presence of an occupant in the first seat when the first seat is at the first location or the second location; and
operating the occupant restraint system to activate at least one passive restraint associated with the first seat based on sensing the presence of the occupant in the first seat.

4. The method of claim 1 wherein at least a portion of the occupant restraint system is integrated with the first seat.

5. The method of claim 1 further comprising:
designating a fixed location in the vehicle for the first seat;
detecting a different seat at the fixed location; and
indicating presence of the different seat at the fixed location.

6. The method of claim 1 further comprising:
designating a fixed location in the vehicle for the first seat;
detecting presence of the first seat at a different location; and
indicating presence of the first seat at the different location.

7. The method of claim 1 further comprising:
detecting presence of a third seat at any location in the vehicle;
determining whether the third seat is identifiable in a configuration of seats in the vehicle; and
providing an indication when the third seat is unidentified in the configuration of seats in the vehicle.

8. The method of claim 1 wherein each of the first and second locations is a different mounting position of the respective seats in the vehicle.

9. A system comprising:
a receiver configured to receive data indicating a location of one or more seats in a vehicle; and
a controller configured to:
operate an occupant restraint system for the one or more seats using a first set of parameters when the data indicates that a first seat is installed at a first location in the vehicle; and
operate the occupant restraint system for the first seat using a second set of parameters when the data indicates that the first seat is removed from the first location and is installed at a second location of a second seat in the vehicle, the second seat being different than the first seat, and the second location being different than the first location.

10. The system of claim 9 further comprising:
a first sensor arranged proximate to the first location in the vehicle, wherein the first sensor is configured to communicate with a device integrated with the first seat, sense the device when the first seat is at the first location in the vehicle, and transmit to the receiver the data indicating that the first seat is at the first location in the vehicle; and
a second sensor arranged proximate to the second location in the vehicle, wherein the second sensor is configured to communicate with the device integrated with the first seat, sense the device when the first seat is at the second location in the vehicle, and transmit to the receiver the data indicating that the first seat is at the second location in the vehicle.

11. The system of claim 10 wherein the device comprises a near field, close range, or short range wireless communication device.

12. The system of claim 9 further comprising:
a sensor configured to sense presence of an occupant in the first seat when the first seat is at the first location or the second location and to transmit information about whether the occupant is present in the first seat,
wherein the receiver is configured to receive the information from the sensor, and
wherein the controller is configured to operate at least one passive restraint associated with the first seat based on the information received from the sensor.

13. The system of claim 9 wherein at least a portion of the occupant restraint system is integrated with the first seat.

14. The system of claim 9 wherein the controller is further configured to:
designate a fixed location in the vehicle for the first seat;
detect a different seat at the fixed location based on data about the different seat received from a sensor associated with the fixed location; and
indicate presence of the different seat at the fixed location.

15. The system of claim 9 wherein the controller is further configured to:
designate a fixed location in the vehicle for the first seat;
detect presence of the first seat at a different location based on data about the first seat received from a sensor associated with the different location; and
indicate presence of the first seat at the different location.

16. The system of claim 9 wherein the controller is further configured to:
detect presence of a third seat at a third location in the vehicle based on data about the third seat received from a sensor associated with the third location in the vehicle;
determine whether the third seat is identifiable in a configuration of seats in the vehicle; and
provide an indication when the third seat is unidentified in the configuration of seats in the vehicle.

17. The system of claim 9 wherein each of the first and second locations is a different mounting position of the respective seats in the vehicle.

18. A system comprising:
a first device integrated with a first seat in a vehicle, wherein the first device is configured to store first data identifying the first seat;
a first sensor arranged proximate to a first location in the vehicle, wherein the first sensor is configured to communicate with the first device and to sense the first data from the first device when the first seat is at the first location in the vehicle; and
a controller configured to receive the first data from the first sensor, determine that the first seat is at the first location based on receiving the first data from the first sensor, and operate an occupant restraint system for the first seat based on determining that the first seat is at the first location.

19. The system of claim 18 further comprising:
a second sensor arranged proximate to a second location in the vehicle, wherein the second sensor is configured to communicate with the first device and to sense the first data from the first device when the first seat is at the second location in the vehicle;
wherein the controller is configured to receive the first data from the second sensor, determine that the first seat is at the second location based on receiving the first data from the second sensor, and operate the occupant restraint system for the first seat based on determining that the first seat is at the second location.

20. The system of claim 19 wherein the second location is of a second seat in the vehicle, the second seat being different than the first seat, and the second location being different than the first location.

21. The system of claim 18 further comprising:
a second sensor configured to sense presence of an occupant in the first seat when the first seat is at the first location and to transmit information about whether the occupant is present in the first seat;
wherein the controller is configured to operate at least one passive restraint associated with the first seat based on the information received from the second sensor.

22. The system of claim 18 wherein the controller is further configured to designate a second location in the vehicle for a second seat, the system further comprising:
a second device integrated with the second seat, wherein the second device is configured to store second data identifying the second seat;
wherein the first sensor is configured to communicate with the second device and to sense the second data from the second device when the second seat is at the first location in the vehicle; and
wherein the controller is configured to receive the second data from the first sensor, determine that the second seat is at the first location based on receiving the second data from the first sensor, and indicate presence of the second seat at the first location.

23. The system of claim 22 wherein each of the first device and the second device comprises a near field, close range, or short range wireless communication device.

24. The system of claim 18 wherein the controller is further configured to designate a second location in the vehicle for a second seat, the system further comprising:
a second device integrated with the second seat, wherein the second device is configured to store second data identifying the second seat; and
a second sensor arranged proximate to a third location in the vehicle, wherein the second sensor is configured to communicate with the second device and to sense the second data from the second device when the second seat is at the third location in the vehicle;
wherein the controller is configured to receive the second data from the second sensor, determine that the second seat is at the third location based on receiving the second data from the second sensor, and indicate presence of the second seat at the third location.

25. The system of claim 24 wherein each of the first device and the second device comprises a near field, close range, or short range wireless communication device.

26. The system of claim 18 wherein:
the first sensor is configured to communicate with a second device integrated with a second seat, wherein the second device is configured to store second data identifying the second seat, and to sense the second data from the second device when the second seat is at the first location in the vehicle; and
the controller is configured to receive the second data from the first sensor, determine whether the second seat belongs to the vehicle, and provide an indication when the second seat does not belong to the vehicle.

27. The system of claim 18 wherein the first device comprises a near field, close range, or short range wireless communication device.

28. A method comprising:
providing a first seat and a second seat in a vehicle;
mounting the first seat at a first location within the vehicle;
sensing the first seat in the first location;
controlling an occupant restraint system of the vehicle in a first manner when the first seat is in the first location in the vehicle;
removing the first seat from the first location;
mounting the second seat at the first location within the vehicle;
sensing the second seat in the first location; and
controlling the occupant restraint system of the vehicle in a second manner when the second seat is in the first location in the vehicle, the second manner being different than the first manner.

* * * * *